United States Patent
Seletskiy et al.

(10) Patent No.: US 12,184,679 B2
(45) Date of Patent: Dec. 31, 2024

(54) SYSTEMS AND METHODS FOR DETECTING MALICIOUS ENTITIES USING WEAK PASSWORDS FOR UNAUTHORIZED ACCESS

(71) Applicant: Cloud Linux Software Inc., Estero, FL (US)

(72) Inventors: Igor Seletskiy, Palo Alto (CA); Dmitrii Sidorov, Smolensk (RU); Sergey Polischuk, Odessa (UA)

(73) Assignee: Cloud Linux Software Inc., Estero, FL (US)

( * ) Notice: Subject to any disclaimer, the term of this patent is extended or adjusted under 35 U.S.C. 154(b) by 486 days.

(21) Appl. No.: 17/472,788

(22) Filed: Sep. 13, 2021

(65) Prior Publication Data
US 2023/0078849 A1   Mar. 16, 2023

(51) Int. Cl.
*H04L 9/40*   (2022.01)
*G06F 21/46*   (2013.01)

(52) U.S. Cl.
CPC .......... *H04L 63/1425* (2013.01); *G06F 21/46* (2013.01); *H04L 63/0209* (2013.01); *H04L 63/101* (2013.01)

(58) Field of Classification Search
CPC ............. H04L 63/0209; H04L 63/0236; H04L 63/0245; H04L 63/083; H04L 63/102; H04L 63/1416; H04L 63/1425; G06F 21/31; G06F 21/46; G06F 21/55; G06F 21/552; G06F 21/554
See application file for complete search history.

(56) References Cited

U.S. PATENT DOCUMENTS

| | | | | |
|---|---|---|---|---|
| 11,853,288 | B1* | 12/2023 | Gogoi | G06F 16/2255 |
| 2005/0198537 | A1* | 9/2005 | Rojewski | H04L 9/3226 726/19 |
| 2007/0250917 | A1* | 10/2007 | Bruchertseifer | H04W 12/02 726/5 |

(Continued)

OTHER PUBLICATIONS

Alsaleh et al. "Revisiting Defenses against Large-Scale Online Password Guessing Attacks" [Online], Feb. 2012 [Retrieved on: Jan. 10, 2024], IEEE, Retrieved from: < https://ieeexplore.ieee.org/stamp/stamp.jsp?tp=&arnumber=5766003 > (Year: 2012).*

*Primary Examiner* — Eric W Shepperd
(74) *Attorney, Agent, or Firm* — ArentFox Schiff LLP; Michael Fainberg

(57) ABSTRACT

Aspects of the disclosure describe methods and systems for detecting malicious entities using weak passwords for unauthorized access. In one exemplary aspect, a method may comprise intercepting, using a WAF, a password input during a login attempt to a web application by an entity. In response to determining that the password is in a database of weak passwords, the method may comprise generating for display, using the WAF, a web page prompting for a password reset for the web application, storing, in a database, an IP address of the entity and information about the login attempt, retrieving information about a first plurality of login attempts made by the entity in the web application for different user profiles. In response to determining that at least a first threshold number of login attempts have been performed by the entity, the method may comprise storing the IP address in a black list.

17 Claims, 5 Drawing Sheets

(56) References Cited

U.S. PATENT DOCUMENTS

| | | | |
|---|---|---|---|
| 2009/0055910 A1* | 2/2009 | Lee | H04L 9/3271 |
| | | | 726/6 |
| 2012/0110668 A1* | 5/2012 | Schechter | G06F 21/46 |
| | | | 726/25 |
| 2012/0239916 A1* | 9/2012 | Malasani | H04W 12/50 |
| | | | 713/1 |
| 2019/0036940 A1* | 1/2019 | Balakrishnan | H04L 63/12 |
| 2019/0190934 A1* | 6/2019 | Peppe | H04L 63/1441 |
| 2020/0380115 A1* | 12/2020 | Knight | G06F 21/46 |
| 2021/0117533 A1* | 4/2021 | Malka | H04L 9/008 |
| 2021/0182378 A1* | 6/2021 | Farivar | G06F 21/46 |
| 2021/0243207 A1* | 8/2021 | Crume | G06F 16/2255 |
| 2021/0288981 A1* | 9/2021 | Numainville | H04L 63/1416 |
| 2021/0306315 A1* | 9/2021 | Wright | G06F 21/45 |
| 2021/0374226 A1* | 12/2021 | Mondello | G06F 21/46 |
| 2022/0147603 A1* | 5/2022 | Liu | H04L 63/0861 |
| 2023/0315835 A1* | 10/2023 | Mo | G06F 21/46 |
| | | | 726/6 |

* cited by examiner

SYSTEMS AND METHODS FOR DETECTING MALICIOUS ENTITIES USING WEAK PASSWORDS FOR UNAUTHORIZED ACCESS

FIELD OF TECHNOLOGY

The present disclosure relates to the field of data security, and, more specifically, to systems and methods for detecting malicious entities using weak passwords for unauthorized access.

BACKGROUND

In the realm of cybersecurity, one of the first lines of defense to a security breach is a user password. Unfortunately, users tend to use weak passwords for their web applications. These passwords are typically found in a list of commonly used passwords, which hackers can effortlessly plug-and-play using a brute-force attack. Once a password matches, the hackers gain access to the applications and user data, as well as gain the ability to install malware.

There are multiple approaches to prevent brute force attacks for web applications. These approaches are based on behavior patterns, rate limits, and Internet Protocol (IP) reputation. However, if a password is weak to begin with, the user's information will always remain in jeopardy. While some approaches may assess password strength, these practices are not consistent across all web applications. There is thus a need for completely blocking access to a web application if a password is weak, which mitigates the ability to determine the password by brute force. Specifically, this method should not should not require being built-in to the web application and should make it impossible for a hacker to circumvent protection by emulating a user's behavior, using distributed attacks to bypass rate limits, or using IP reputation.

Password strength is normally assessed when a user is setting up a new password or is updating his/her password (e.g., due to a periodic requirement). Suppose that a user sets a password when creating an account for a web application. Even if the password passes the initial requirements of the web application, hackers are constantly adding onto their brute-force attack password databases and a password that was previously acceptable may be compromised. Therefore, it is not enough to assess password strength at account creation or periodically.

SUMMARY

To address these shortcomings, aspects of the disclosure describe methods and systems for detecting malicious entities using weak passwords for unauthorized access. In one exemplary aspect, a method may comprise configuring a web application firewall (WAF) to monitor login credentials for one or more web applications. The method may comprise intercepting, using the WAF, a password input during a login attempt to a web application by an entity. The method may comprise determining whether the password is in a database of weak passwords. In response to determining that the password is in the database of weak passwords, the method may comprise generating for display, using the WAF, a web page prompting for a password reset for the web application. The method may comprise storing, in a database, an IP address of the entity and information about the login attempt. The method may comprise retrieving information about a first plurality of login attempts made by the entity in the web application for different user profiles. In response to determining that at least a first threshold number of login attempts have been performed by the entity, the method may comprise storing the IP address in a black list.

In some aspects, the method may comprise detecting a subsequent login attempt at the web application or a different web application. In response to determining that the subsequent login attempt is through the IP address in the black list, the method may comprise preventing authorization to login successfully.

In some aspects, the first plurality of login attempts further comprises a subset of login attempts made by the entity in at least one other web application.

In some aspects, the first plurality of login attempts further comprises a subset of login attempts made by the entity using more than one password from the database of weak passwords for a single user profile.

In some aspects, determining whether the password is in the database of weak passwords is in response to determining that the password is a valid login credential of the web application.

In some aspects, in response to determining that the password is not in the database of weak passwords and that the password is correct, the method may comprise storing the password, the IP address of the entity, and the information about the login attempt in the database. The method may comprise retrieving information about a second plurality of login attempts in which the password was used for successful login into the web application by different user profiles. In response to determining that at least a second threshold number of login attempts have been performed using the password, the method may comprise including the password in the database of weak passwords.

In some aspects, the web page redirects to a password reset page of the web application.

In some aspects, intercepting occurs prior to logging into the web application.

It should be noted that the methods described above may be implemented in a system comprising a hardware processor. Alternatively, the methods may be implemented using computer executable instructions of a non-transitory computer readable medium.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and computer program product for detecting malicious entities using weak passwords for unauthorized access. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

A web application firewall (WAF) is a type of application firewall that applies specifically to web applications. Typically, WAF monitors and filters Hypertext Transfer Protocol (HTTP) traffic between a web application and a client device. Unlike a regular firewall, which serves as a security gate between servers, a WAF can filter the content of specific web applications. A web application or web app is a client-server computer program that a client runs in a web browser. A web app is stored on a remote server and delivered over the Internet through a browser interface. The web browser is effectively a part of the application architecture. However, certain web applications may provide different types of access—one being the web application in the browser, and another being a web service providing an Application Programming Interface (API) to interact with applications or between applications. The WAF described in the present disclosure may handle any type of access.

By inspecting HTTP traffic, a WAF can prevent attacks such as Structured Query Language (SQL) injections, cross-site scripting (XSS), file inclusion, and security misconfigurations, originating from a web application. A WAF identifies these attacks using parsing, signature detection, and specially configured rule-sets (also known as policies).

The functionality of a WAF can be implemented in software or hardware. For example, a WAF may be a virtual or physical appliance (e.g., a stand-alone device or network component) that prevents vulnerabilities in web applications from being exploited by outside threats.

In an exemplary aspect, the systems and methods disclosed herein involve blocking, using a WAF, a user (or a hacker) from logging into a web application with a weak password and forcing the user to reset the password.

Figure 1:
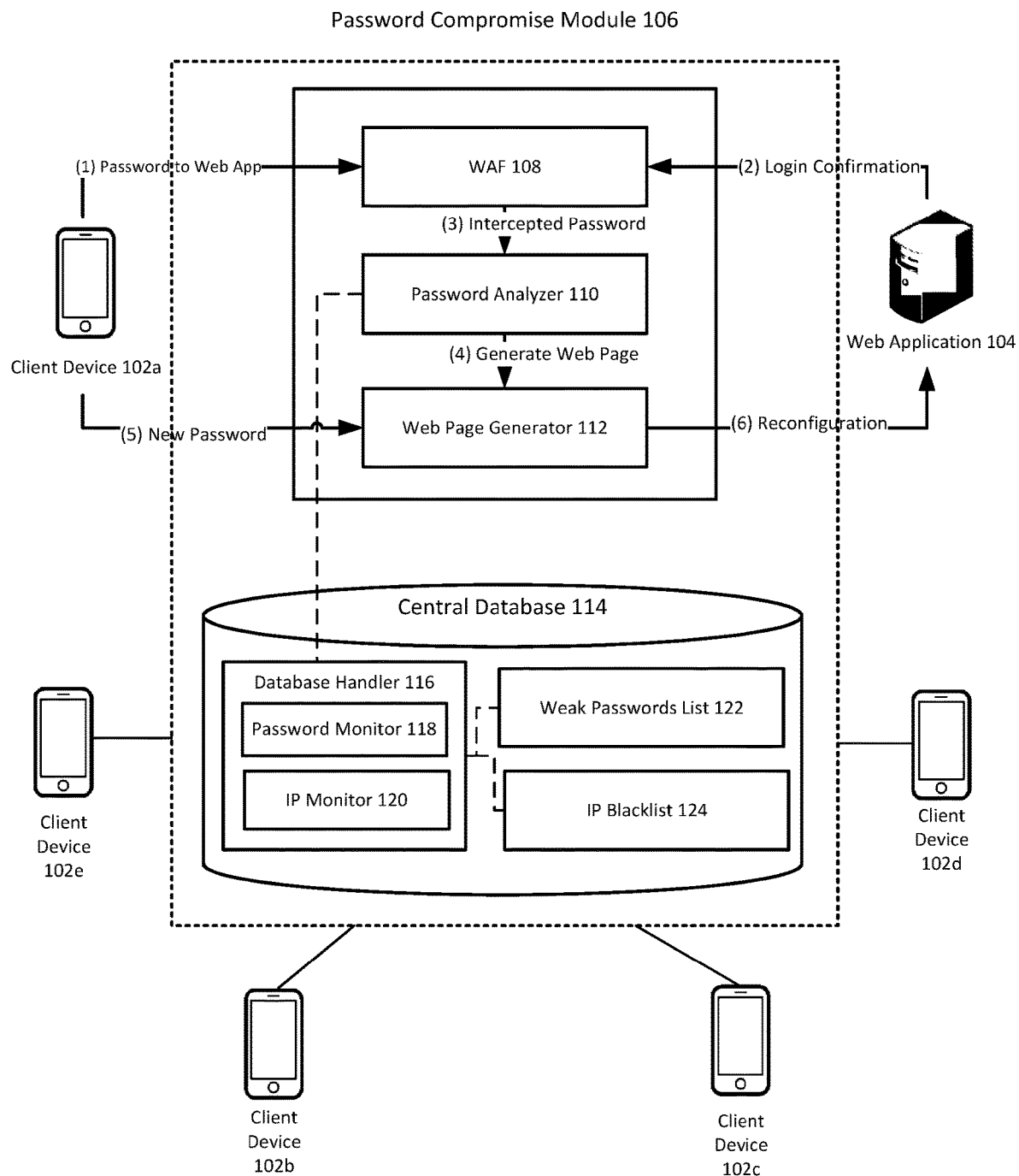
FIG. 1 is a block diagram illustrating a system for detecting malicious entities using weak passwords for unauthorized access.

FIG. 1 is a block diagram illustrating system 100 for detecting malicious entities using weak passwords for unauthorized access, according to an exemplary aspect. System 100 includes a plurality of client devices 102 (e.g., client devices 102a, 102b, 102c, 102d, and 102e), web application 104, password compromise module 106, and central database 114. Password compromise module 106 may include various components including WAF 108, password analyzer 110, and web page generator 112.

In system 100, password compromise module 106 may sit in front of web application 104 and is configured to intercept a password entered at a login screen of web application 104 using WAF 108, determine whether the password is weak, and generate a web page prompting a user to change the password in response to determining that the password is weak.

In one aspect, WAF 108 intercepts a first HTTP message to web application 104 from client device 102a—the first message comprising a login username and password for web application 104. For example, WAF 108 may generate and execute a WAF rule that intercepts a HTTP request to a login submission page and extracts the password parameter from the HTTP request. It should be noted that although most login submissions are done over HTTPS (SSL encrypted protocol), WAF resides after SSL is terminated, which is why a WAF captures everything in the request in an unencrypted format. In some optional aspects, WAF 108 may subsequently intercept a second HTTP message to client device 102a from web application 104. The second message may comprise an indication that the provided login username and password are valid login credentials to access web application 104. For example, web application 104 may be a shopping application. A user may enter his/her username and password into client device 102a and web application 104 may provide an indication to client device 102a that the login information is correct, allowing the user to access his/her shopping profile and orders. If the login confirmation is not received by WAF 108, it is possible that the individual attempting to access web application 104 is not an authorized user. Because of this, a password reset is not prompted. The interception of the second message may be optional depending on whether the WAF 108 is pre-configured to intercept validation messages.

In response to intercepting at least the first message, password analyzer 110 requests database handler 116 to check whether the intercepted password is found in central database 114 comprising known weak passwords. These weak passwords may be stored in weak passwords list 122. Known weak passwords may be predetermined terms that have a high probability of being compromised. Suppose that the password of the user is "hello123." Database handler 116 may find "hello123" in weak passwords list 122. Password analyzer 110 may then generate a binary output (e.g., "1" for yes, and "0" for no). If the output is positive (i.e., the password is in weak passwords list 122), web page generator 112 may generate a web page prompting the user to change the password.

In addition, database handler 116 may store, in central database 114, an IP address of the entity and information about the login attempt. The information about the login attempt may include a timestamp indicating when the login was attempted, at least one identifier of web application 104 (e.g., name, developer name, version, etc.), an identifier of the device on which the login was attempted (e.g., name of device, version, hardware specifications, etc.), the login credential, and information about the network (e.g., name, type, version, etc.). For example, an entry stored in central database 114 may be:

| IP Address | Time | Day | Web Application | Username | Password | ... | Device |
|---|---|---|---|---|---|---|---|
| 192.158.1.38 | 19:12:12 | Jan. 01, 2021 | Amazon | zzz@zzz.com | hello123 | ... | ... |

Password compromise module 106 may be software that is installed on a client device 102. In some aspects, password compromise module 106 is split into a thin client application and a thick client application. For example, the thin client application may be installed on client device 102a and the thick client application may be installed on a remote server (not shown) configured to communicate with the thin client application (e.g., via the Internet). In this example, password analyzer 110, web page generator 112, and central database 114 may be part of the thick client application. For example, WAF 108 may intercept a password provided by client device 102a and transmit the password to password analyzer 110 of password compromise module 106 on a remote server.

In an exemplary aspect, database handler 116 may retrieve information about a first plurality of login attempts made by the entity in web application 104 for different user profiles. For example, the entity may use client device 102a to access multiple different accounts on web application 104. For each access attempt where the password is weak, database handler 116 generates a new access entry. Periodically, IP monitor 120 may determine the number of attempts an entity has made in a web application. For example, IP monitor 120 may retrieve the following entries comprising the IP address of the entity and the web application:

| IP Address | Time | Day | Web Application | Username | Password | ... | Device |
|---|---|---|---|---|---|---|---|
| 192.158.1.38 | 19:12:12 | Jan. 01, 2021 | Amazon | zzz@zzz.com | hello123 | ... | 102a |
| 192.158.1.38 | 19:12:15 | Jan. 01, 2021 | Amazon | aaa@zzz.com | hello123 | ... | 102a |
| 192.158.1.38 | 19:12:18 | Jan. 01, 2021 | Amazon | bbb@zzz.com | hello123 | ... | 102a |
| ... | ... | ... | ... | ... | ... | ... | ... |
| 192.158.1.38 | 19:12:21 | Jan. 01, 2021 | Amazon | ccc@zzz.com | hello123 | ... | 102a |

In response to determining that at least a first threshold number of login attempts have been performed by the entity, IP monitor 120 may store the IP address in a black list (e.g., IP blacklist 124). For example, if the first threshold number is 10 (set by IP monitor 120) and there are 11 retrieved entries featuring the IP address and the web application, the entity associated with the IP address may be identified by password compromise module 106 as a malicious entity. Thus, if WAF 108 detects a subsequent login attempt at the web application or a different web application, in response to determining that the subsequent login attempt is through the IP address in the black list, WAF 108 may prevent giving authorization to login successfully (regardless if the password is weak or not).

In some aspects, IP monitor 120 may only retrieve entries within a certain time period (e.g., all entries within the hour). In some aspects, IP monitor 120 may further retrieve login attempts into other web applications. Thus, the first plurality of login attempts may include a subset of login attempts made by the entity in at least one other web application as shown below:

| IP Address | Time | Day | Web Application | Username | Password | ... | Device |
|---|---|---|---|---|---|---|---|
| 192.158.1.38 | 19:12:12 | Jan. 01, 2021 | Amazon | zzz@zzz.com | hello123 | ... | 102a |
| 192.158.1.38 | 19:12:15 | Jan. 01, 2021 | Amazon | aaa@zzz.com | hello123 | ... | 102a |
| 192.158.1.38 | 19:12:18 | Jan. 01, 2021 | Amazon | bbb@zzz.com | hello123 | ... | 102a |
| 192.158.1.38 | 19:20:01 | Jan. 01, 2021 | Gmail | zzz@zzz.com | hello123 | ... | 102a |
| ... | ... | ... | ... | ... | ... | ... | ... |
| 192.158.1.38 | 19:23:11 | Jan. 01, 2021 | Facebook | zzz@zzz.com | hello123 | ... | 102a |

Because the login attempts to a Gmail account and Facebook account are included, there are more entries to compare against the first threshold number. This increases the likelihood of an entity being identified as a malicious entity. In some aspects, because there are more entries, the threshold number may be increased to adjust the sensitivity of password compromise module 106 and prevent false negatives/positives.

In some aspects, IP monitor 120 may retrieve entries that share an IP address, a web application, and a user login credential. Thus, the first plurality of login attempts may include a subset of login attempts made by the entity using more than one password from the database of weak passwords for a single user profile as shown below:

| IP Address | Time | Day | Web Application | Username | Password | ... | Device |
|---|---|---|---|---|---|---|---|
| 192.158.1.38 | 19:12:12 | Jan. 01, 2021 | Amazon | zzz@zzz.com | hello | ... | 102a |
| 192.158.1.38 | 19:12:15 | Jan. 01, 2021 | Amazon | zzz@zzz.com | hello1 | ... | 102a |
| 192.158.1.38 | 19:12:18 | Jan. 01, 2021 | Amazon | zzz@zzz.com | hello12 | ... | 102a |
| ... | ... | ... | ... | ... | ... | ... | ... |
| 192.158.1.38 | 19:12:21 | Jan. 01, 2021 | Amazon | zzz@zzz.com | hello123 | ... | 102a |

IP monitor 120 may then identify each unique password in the retrieved entries and compare them against weak passwords list 122. Suppose that all of the passwords are present in weak passwords list 122. IP monitor 120 may count a number of instances in which a unique password entered in the web application was found in the retrieve entries. IP monitor 120 may then compare that value to a threshold number. For example, if 10 entries were identified and 5 is the threshold number, because there number of instances exceeds the threshold number, IP monitor 120 may store the IP address in IP blacklist 124 and identify the entity as malicious.

In some aspects, whenever an entity with an IP address in IP blacklist 124 attempts to log in to a web application, password compromise module 106 may retrieve the password entered by the IP address as a login credential. Password monitor 118 may then determine whether the retrieved password is in the database of weak passwords (e.g., weak passwords list 122). If the password is not in the database, password monitor 118 may add the password to weak passwords list 122 (on the merit that a malicious entity has attempted to use the password).

In some aspects, multiple client devices have password compromise module 106 installed. In some aspects, each of the client devices (e.g., 102a, 102b, 102c, 102d, and 102e) may periodically synchronize their central database 114 with one another. In other aspects, password compromise module 106 may also be installed on a remote server and each password compromise module 106 may synchronize central database 114 with the remote server.

In some aspects, WAF 108 intercepts a password from client device 102a and a confirmation from web application 104 that the password is correct. Password analyzer 110 may then determine, via database handler 116, that the password is not in the database of weak passwords. In response, password monitor 118 stores the password, the IP address of the entity, and further information about the login attempt in central database 114. Password monitor 118 further retrieves information about a second plurality of login attempts in which the password was used for successful login into the web application by different user profiles. For example, password monitor 118 may retrieve the following entries:

| IP Address | Time | Day | Web Application | Username | Password | ... | Device |
|---|---|---|---|---|---|---|---|
| 192.158.1.34 | 19:12:12 | Jan. 06, 2021 | Amazon | erw@zyz.com | Treats931 | ... | 102a |
| 192.134.1.38 | 11:12:15 | Feb. 01, 2021 | Amazon | dfd@zfz.com | Treats931 | ... | 102b |
| 192.118.1.38 | 1:12:18 | Jan. 02, 2021 | Amazon | zfd@zfz.com | Treats931 | ... | 102c |
| ... | ... | ... | ... | ... | ... | ... | ... |
| 192.158.20.3 | 15:12:21 | Mar. 16, 2021 | Amazon | zzn@zzz.com | Treats931 | ... | 102e |

As can be seen, different devices with different IP addresses across a period of time have used the password "Treats931." Password monitor 118 may determine the number of entries in which the password shows up (in some cases across different web applications to adjust sensitivity) for a unique username. In response to determining that at least a second threshold number of login attempts have been performed using the password, password monitor 118 may include the password in the database of weak passwords (e.g., weak passwords list 122).

In some optional aspects, database handler 116 may determine that the intercepted password does not match any of the passwords in the database of weak passwords (e.g., weak passwords list 122). In this situation, password analyzer 110 may extract attributes associated with the intercepted password (e.g., use of numbers, upper-case lowercase letters, characters, etc.) and determine a strength level accordingly. For example, the use of multiple numbers, variations of capitalization, and randomness of characters may be interpreted by the password analyzer 110 as a password with a better strength level than a password that features a lot of repetition, no capitalization variations, or randomness in characters. Based on these features, password analyzer 110 assigns a numerical value (i.e., the strength level). Each attribute may be associated with a certain numerical value that contributes to the strength level. For example, the variation of capitalization may be worth a strength value of 0.1 and the use of numbers may be worth a strength value of 0.3. Password analyzer 110 sums these values to get the strength level. Password analyzer 110 may then compare the determined strength level with the threshold strength level. In response to determining that the strength level is less than the threshold strength level, password analyzer 110 may command web page generator 112 to generate a web page that prompts a password reset. WAF 108 may then redirect the user to a "reset your password" web page. The web page may display a message such as: "Your password was compromised, please reset it."

In one aspect, subsequent to intercepting a weak password, instead of redirecting to a password reset page, password compromise module 106 may trigger a script on a server that automatically resets the password, and sends the new password to the user (e.g., via email). In some conventional approaches, the password reset occurs in response to the user requesting that the password be changed (e.g., pressing "forgot my password"). The script may, for example, generate a string comprising a set of random characters and verify that the string does not match a password in the database of weak password. However, in the present disclosure, the change is automatic and is in response to the password being determined to be prone to a brute force attack (e.g., the password is in a database of weak passwords). Thus the user does not decide whether to change the password manually.

In one aspect, upon successful login, password compromise module 106, using WAF, may generate a new web page and ask for a verification code sent to the user (e.g., via email), thus providing a form of two factor authentication.

Figure 2:
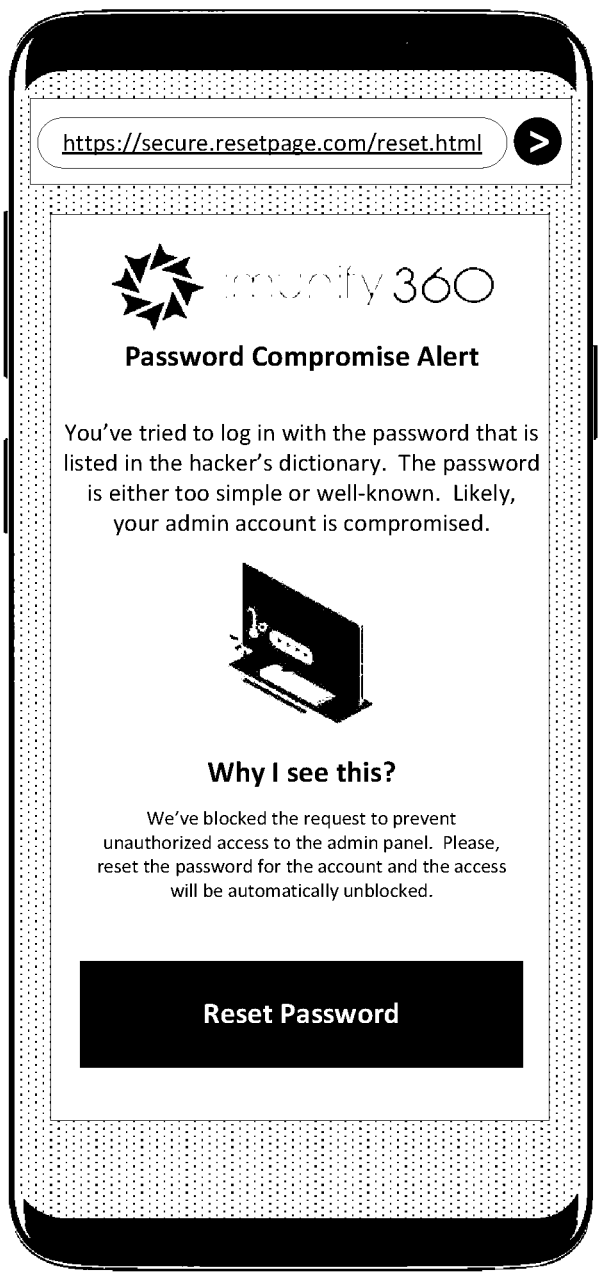
FIG. 2 is a diagram illustrating a password compromise alert.

FIG. 2 is diagram 200 illustrating a password compromise alert. Diagram 200 depicts a web page generated by web page generator 112 and redirected to by WAF 108. The web page includes a password compromise alert that indicates to the user that the password used by the user is in a "hacker's dictionary" (e.g., a weak password list). The web page further indicates that the request to login has been blocked to prevent unauthorized access to an administrative panel (e.g., user settings). Lastly, the web page provides a link to reset the password.

In one aspect, web page generator 112 may use a single page residing at a single Uniform Resource Locator (URL). For example, a URL to a reset page for the web application may be added by the WAF when redirecting. In another aspect, web page generator 112 may use a different web page for each web application, domain, or server. For example, if the base URL of the generated reset page is secure.com/reset.html and web application 104 is installed at domain.com/wp/, with reset password page for web application 104 being at domain.com/wp/reset_password.php, web page generator 112 may generate the URL secure.resetpage.com/reset.html?rp=https://domain.com/wp. The web page may display a message "your password for website domain.com/wp/is compromised, please reset your password by following reset link: secure.resetpage.com/reset.html?rp=https://domain.com/wp".

In some aspects, web page generator 112 may include the login username as a parameter. For example, the login username may be "USERNAME." Accordingly, the URL may be secure.resetpage.com/reset.html?rp=https://domain.com/wp&login=USERNAME. The login username can be used as part of the message, as well as part of the reset link provided to user. The inclusion of the username is to make the user more at ease when accessing the web page. Because the web page is not integrated with the web application itself (e.g., is not built by the web application), the web page may appear fake to the user. Thus the username provides the user with familiarity.

In one aspect, subsequent to generating for display the web page on client device 102, the user may enter a new password. Password compromise module 106 may receive the new password and send it through password analyzer 110 to ensure that the new password is not in the database of weak passwords. If the new password is not in the database of weak passwords, password compromise module 106 may reconfigure web application 104 to accept the new password instead of the old password as the valid login credential. If the new password is in the database of weak passwords, password compromise module 106 may prompt the user to provide a newer password (i.e., intercept the new password using WAF 108).

Figure 3:
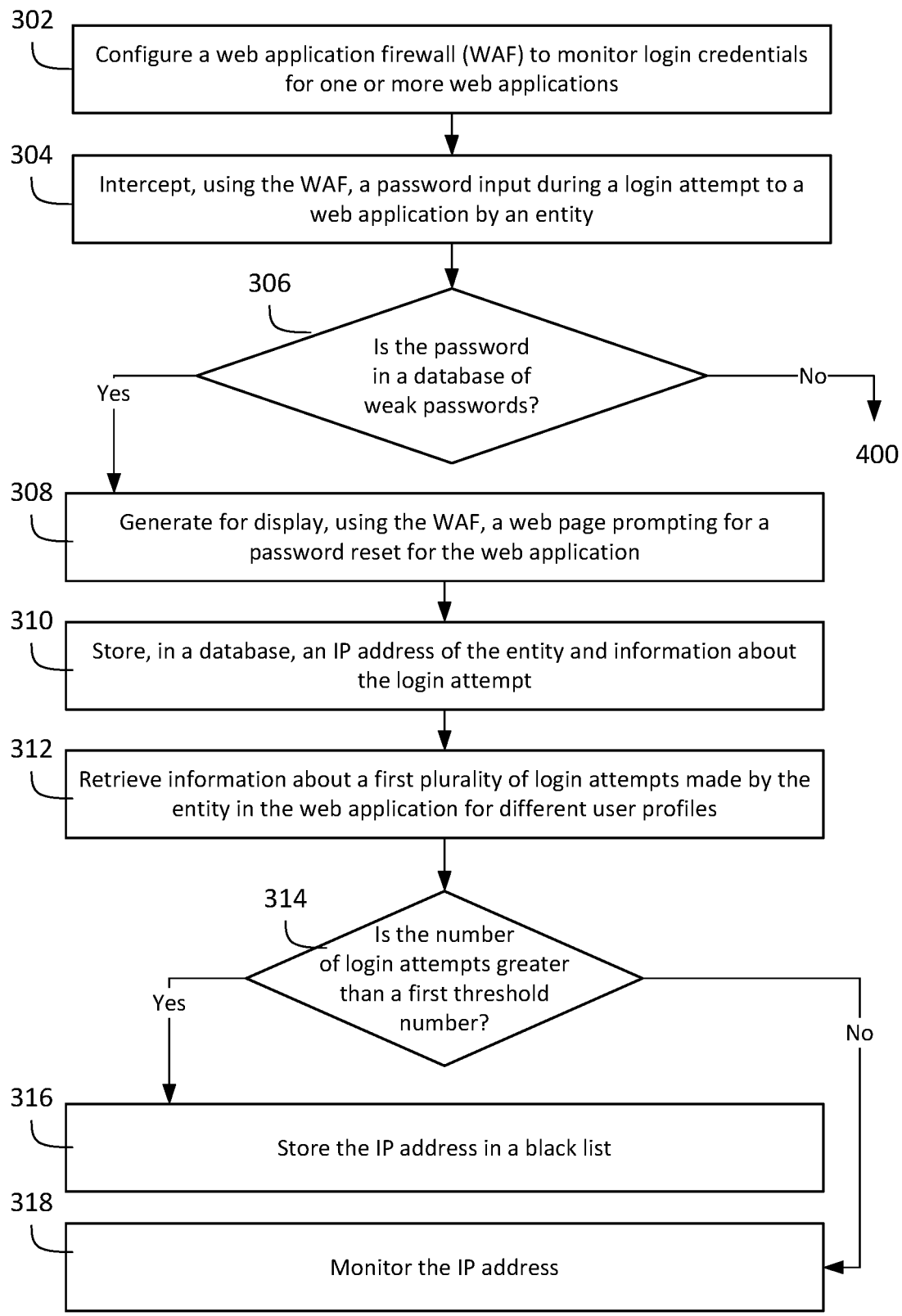
FIG. 3 is a flow diagram illustrating a method for detecting malicious entities using weak passwords for unauthorized access.

FIG. 3 is a flow diagram illustrating method 300 for detecting malicious entities using weak passwords for unauthorized access. At 302, password compromise module 106 configures WAF 108 to monitor login credentials for one or more web applications. At 304, WAF 108 intercepts a password input during a login attempt to a web application by an entity. At 306, password analyzer 110 determines whether the password is in a database of weak passwords (e.g., weak passwords list 122 in central database 114). In response to determining that the password is in the database of weak passwords, method 300 advances to 308, where web page generator 112 generates a web page prompting for a password reset for the web application and WAF 108 redirects from the login page to the generated web page. If the password is not in the database of weak passwords, method 300 advances to method 400 (described below).

At 310, password compromise module 106 stores, in a database (e.g., central database 114), an IP address of the entity and information about the login attempt. At 312, database handler 116 retrieves information about a first plurality of login attempts made by the entity in the web application for different user profiles. At 314, database handler 116 determines whether the number of login attempts is greater than a first threshold number. If the number is greater than the first threshold number, at 316, database handler 116 stores the IP address in IP blacklist 124. If the number is not greater than the first threshold number, at 318, IP monitor 120 of database handler 116 continues to monitor the IP address.

Figure 4:
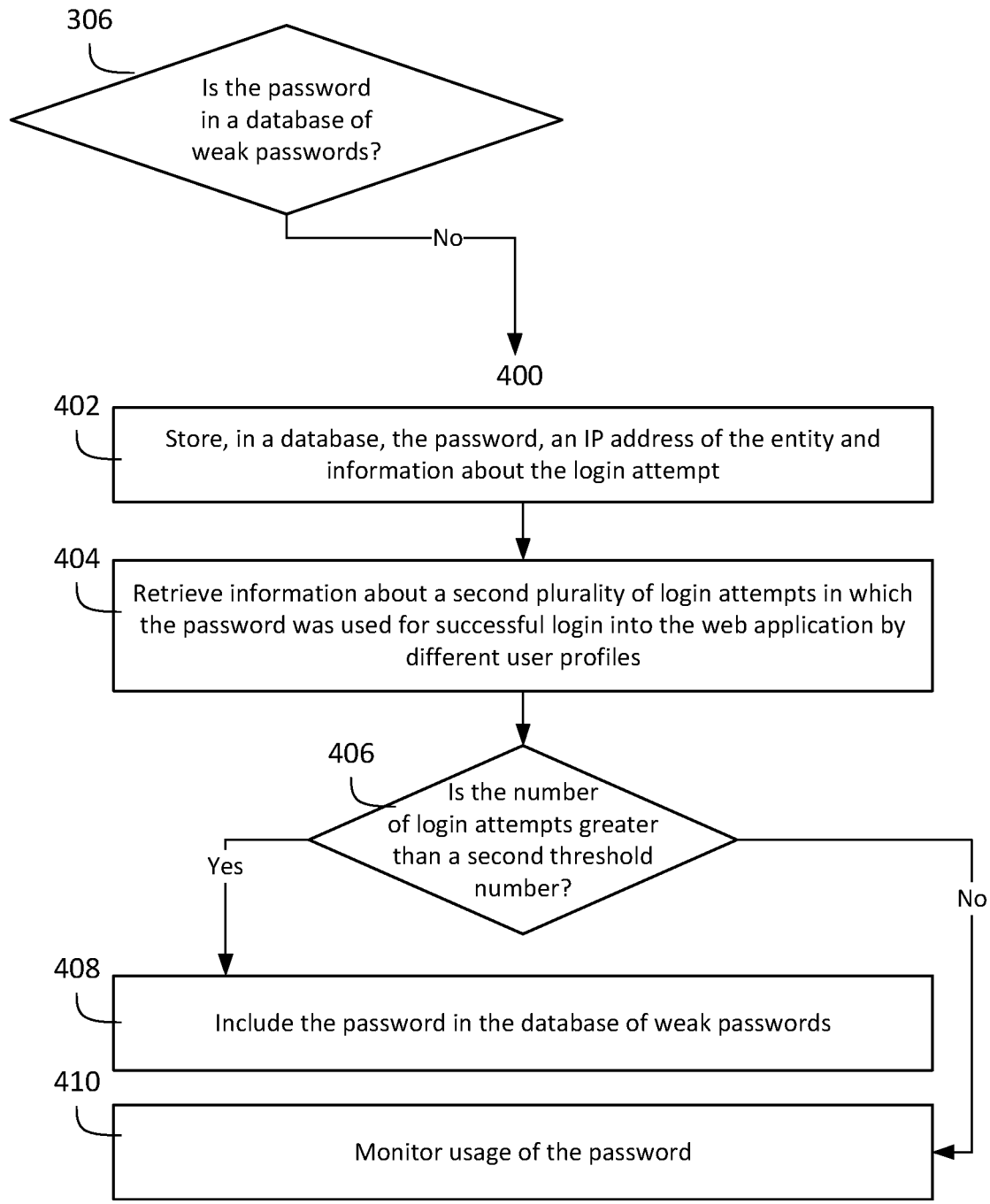
FIG. 4 is a flow diagram illustrating a method for updating a database of weak passwords.

FIG. 4 is a flow diagram illustrating method 400 for updating a database of weak passwords. As noted before, method 400 may be executed by system 100 in response to password analyzer 110 determining that the password is not in the database of weak passwords. At 402, password compromise module 106 stores, in central database 114, the password, an IP address of the entity, and information about the login attempt. At 404, database handler 116 retrieves information about a second plurality of login attempts in which the password was used for successful login into the web application by different user profiles.

At 406, database handler 116 determines whether the number of login attempts is greater than a second threshold number. If the number is greater than the second threshold number, at 408, database handler 116 includes the password in the database of weak passwords (e.g., weak passwords list 122 in central database 114). If the number is not greater than the second threshold number, at 410, password monitor 118 of database handler 116 continues to monitor the password.

Figure 5:
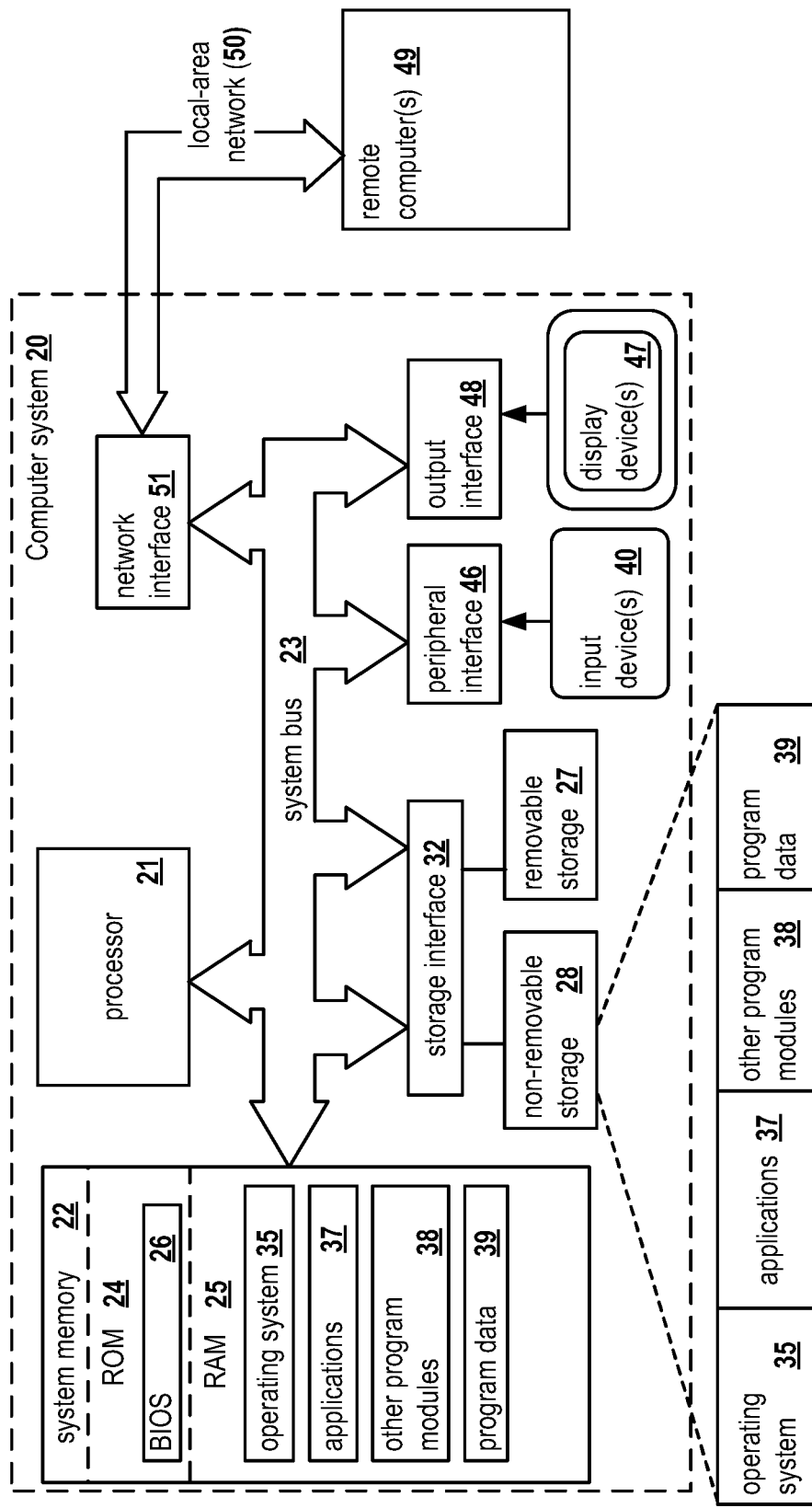
FIG. 5 is a block diagram of a computer system on which the disclosed system and method can be implemented according to an exemplary aspect.

FIG. 5 is a block diagram illustrating a computer system 20 on which aspects of systems and methods for detecting malicious entities using weak passwords for unauthorized access in accordance with an exemplary aspect. It should be noted that the computer system 20 can correspond to client device 102, for example, described earlier. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include Peripheral Component Interconnect (PCI), Instruction Set Architecture (ISA), PCI-Express, HyperTransport™, InfiniBand™, Serial Advanced Technology Attachment (ATA), I2C, and other suitable interconnects . . . .

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, static random access memory (SRAM), dynamic random access memory (DRAM), zero capacitor RAM, twin transistor RAM, enhanced dynamic random access memory (eDRAM), extended data output random access memory (EDO RAM), double data rate random access memory (DDR RAM), electrically erasable programmable read-only memory (EEPROM), nano random access memory (NRAM), resistive random access memory (RRAM), silicon-oxide-nitride-silicon (SONOS) based memory, phase-change random access memory (PRAM); flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, Synchronous Optical Networking (SONET) interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or wide area network (WAN), or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for detecting malicious entities using weak passwords for unauthorized access, the method comprising:
configuring a web application firewall (WAF) to monitor login credentials for one or more web applications;
intercepting, using the WAF, a password input during a login attempt to a web application by an entity;
determining whether the password is in a database of weak passwords; and
in response to determining that the password is in the database of weak passwords:
generating for display, using the WAF, a web page prompting for a password reset for the web application;
storing, in a database, an IP address of the entity and information about the login attempt;
retrieving information about a first plurality of login attempts made by the entity within a given period of time in the web application for different user profiles, wherein the first plurality of login attempts further comprises a subset of login attempts made by the entity in which a unique password from the database of weak passwords was used for a single user profile within the given period of time; and
in response to determining that at least a first threshold number of login attempts have been performed by the entity in which a unique password from the database of weak passwords has been used, storing the IP address in a black list.

2. The method of claim 1, further comprising:
detecting a subsequent login attempt at the web application or a different web application; and in response to determining that the subsequent login attempt is through the IP address in the black list, preventing authorization to login successfully.

3. The method of claim 1, wherein the first plurality of login attempts further comprises a subset of login attempts made by the entity in at least one other web application.

4. The method of claim 1, wherein determining whether the password is in the database of weak passwords is in response to determining that the password is a valid login credential of the web application.

5. The method of claim 1, further comprising:
in response to determining that the password is not in the database of weak passwords and that the password is correct, storing the password, the IP address of the entity, and the information about the login attempt in the database;
retrieving information about a second plurality of login attempts in which the password was used for successful login into the web application by different user profiles; and
in response to determining that at least a second threshold number of login attempts have been performed using the password, including the password in the database of weak passwords.

6. The method of claim 1, wherein the web page redirects to a password reset page of the web application.

7. The method of claim 1, wherein the intercepting occurs prior to logging into the web application.

8. A system for detecting malicious entities using weak passwords for unauthorized access, the system comprising:
a hardware processor configured to:
configure a web application firewall (WAF) to monitor login credentials for one or more web applications;
intercept, using the WAF, a password input during a login attempt to a web application by an entity;

determine whether the password is in a database of weak passwords; and in response to determining that the password is in the database of weak passwords:

generate for display, using the WAF, a web page prompting for a password reset for the web application;

store, in a database, an IP address of the entity and information about the login attempt;

retrieve information about a first plurality of login attempts made by the entity within a given period of time in the web application for different user profiles, wherein the first plurality of login attempts further comprises a subset of login attempts made by the entity in which a unique password from the database of weak passwords was used for a single user profile within the given period of time; and in response to determining that at least a first threshold number of login attempts have been performed by the entity in which a unique password from the database of weak passwords has been used, store the IP address in a black list.

9. The system of claim 8, wherein the hardware processor is further configured to:

detect a subsequent login attempt at the web application or a different web application; and in response to determining that the subsequent login attempt is through the IP address in the black list, prevent authorization to login successfully.

10. The system of claim 8, wherein the first plurality of login attempts further comprises a subset of login attempts made by the entity in at least one other web application.

11. The system of claim 8, wherein the hardware processor is further configured to determine whether the password is in the database of weak passwords in response to determining that the password is a valid login credential of the web application.

12. The system of claim 8, wherein the hardware processor is further configured to:

in response to determining that the password is not in the database of weak passwords and that the password is correct, store the password, the IP address of the entity, and the information about the login attempt in the database;

retrieve information about a second plurality of login attempts in which the password was used for successful login into the web application by different user profiles; and in response to determining that at least a second threshold number of login attempts have been performed using the password, include the password in the database of weak passwords.

13. The system of claim 8, wherein the web page redirects to a password reset page of the web application.

14. The system of claim 8, wherein the intercepting occurs prior to logging into the web application.

15. A non-transitory computer readable medium storing thereon computer executable instructions for detecting malicious entities using weak passwords for unauthorized access, including instructions for:

configuring a web application firewall (WAF) to monitor login credentials for one or more web applications;

intercepting, using the WAF, a password input during a login attempt to a web application by an entity;

determining whether the password is in a database of weak passwords; and in response to determining that the password is in the database of weak passwords:

generating for display, using the WAF, a web page prompting for a password reset for the web application;

storing, in a database, an IP address of the entity and information about the login attempt;

retrieving information about a first plurality of login attempts made by the entity within a given period of time in the web application for different user profiles, wherein the first plurality of login attempts further comprises a subset of login attempts made by the entity in which a unique password from the database of weak passwords was used for a single user profile within the given period of time; and in response to determining that at least a first threshold number of login attempts have been performed by the entity in which a unique password from the database of weak passwords has been used, storing the IP address in a black list.

16. The non-transitory computer readable medium of claim 15, further comprising instructions for:

detecting a subsequent login attempt at the web application or a different web application; and in response to determining that the subsequent login attempt is through the IP address in the black list, preventing authorization to login successfully.

17. The non-transitory computer readable medium of claim 15, wherein the first plurality of login attempts further comprises a subset of login attempts made by the entity in at least one other web application.

* * * * *